July 14, 1925.  1,545,978
J. L. ROLLINS
DIMMER GLASSES
Filed Oct. 31, 1923
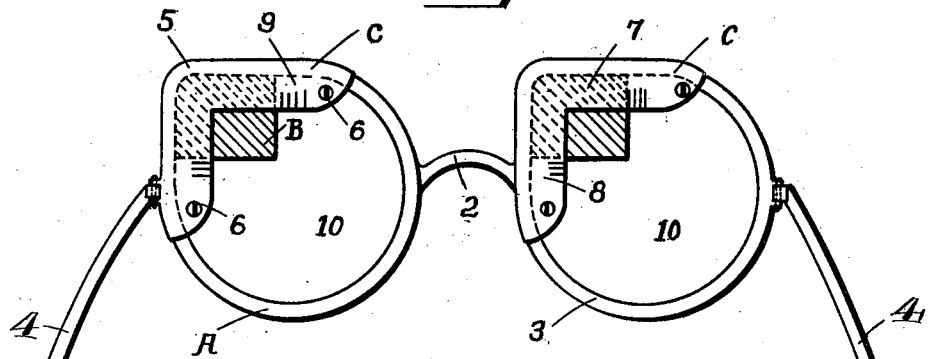
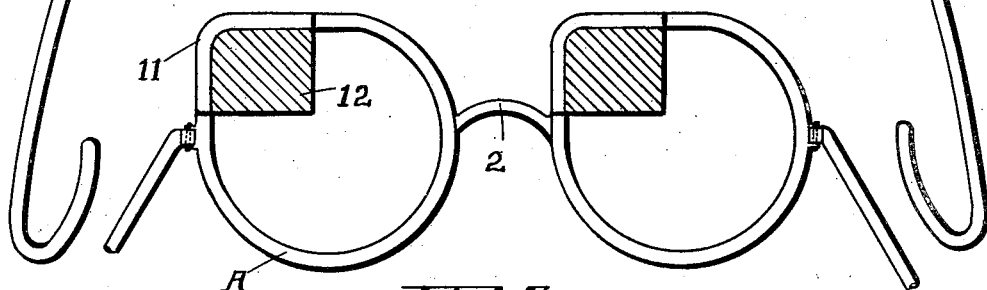
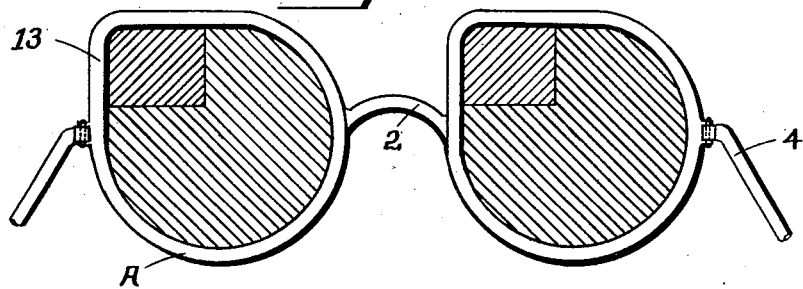
INVENTOR
JARROT L ROLLINS
BY
ATTORNEYS Patented July 14, 1925.

1,545,978

UNITED STATES PATENT OFFICE.

JARROT L. ROLLINS, OF AUBURN, CALIFORNIA.

DIMMER GLASSES.

Application filed October 31, 1923. Serial No. 671,928.

*To all whom it may concern:*

Be it known that I, JARROT L. ROLLINS, a citizen of the United States, residing at Auburn, county of Placer, and State of California, have invented new and useful Improvements in Dimmer Glasses, of which the following is a specification.

This invention relates to eye glasses such as spectacles and the like, and especially to that type which is worn to protect the eyes from a strong light or glare.

The object of the present invention is especially to protect drivers of automobiles from the intense glare of headlights of approaching machines when operating at night, and also from sun glare during the day; and further, to give unobstructed vision of the road between the approaching machine and of the road on the driver's side beyond the approaching automobile as safety factors in driving automobiles and other vehicles at night, and also to protect the eyes of chauffeurs and operators of other vehicles at night and persons in said vehicles wearing the device, from the damage of intense light.

This invention is further useful to engineers, firemen and crews of railway trains and elsewhere when intense light should be avoided as a safety factor in operating as well as a protection for the eyes.

The invention more specifically stated embodies a spectacle frame provided with hinge bows or like means to secure the same to the wearer. It further embodies a semi-transparent or translucent substance so constituted as to dim a light when viewed therethrough, and so positioned in the spectacle frame as not to be used by the wearer except to intercept and dim bright lights when desired and then only by slightly moving the head to a position where the dimming medium will be interposed between the eyes of the operator and the source of light.

The invention also embodies an adjustable feature whereby the light intercepting medium may be adjusted horizontally and vertically with relation to the spectacle frame and the eyes, thus insuring proper adjustment for the wearer.

One form which my invention may assume is exemplified in the following description and illustrated in the accompanying drawings, in which—

Fig. 1 is a front view of a pair of spectacles showing the application of the invention.

Fig. 2 is a modified form thereof.

Fig. 3 shows another modification.

Referring to the drawings in detail, and particularly to Fig. 1, A indicates in general a pair of eye glasses consisting of a bridge or nose piece 2, to which the spectacle frames 3 are secured in any suitable manner, the spectacle frames being provided with hinge bows 4 which are adapted to be passed behind the ears of the wearer to secure the spectacle frames.

By again referring to Fig. 1 it will be noted that the upper left hand corner of each spectacle frame 3 is rectangular in shape, while the remaining portion of each spectacle frame is elliptical shaped or rounded as here shown. This particular shape produces extended portions 5 on each spectacle frame which are provided for the reception of the dimming medium hereinafter to be referred to and generally indicated at B.

The material used for dimming the light may be any suitable transparent or translucent substance, such as colored glass or celluloid, so treated as to dim or screen out the bright rays of light passing therethrough and to such a degree as may prove desirable, thereby affording vision through the dimming medium and, at the same time, preventing any blinding action as far as the eyes are concerned.

In this instance we will assume that colored celluloid is employed as indicated at B. The celluloid is in this instance frictionally secured or clamped in auxiliary frame pieces such as indicated at C. These frames are constructed of thin metal or a like material and are U-shaped in cross-section to straddle the spectacle frames. The inner side of each frame thus presents a slot or channel into which the celluloid B may be inserted, and it is thereby secured by a pair of clamping screws such as indicated at 6. These screws secure the celluloid to the spectacles as they exert a sufficient pressure to clamp the celluloid securely in place.

The clamping frames are L-shaped as shown and they therefore provide an upper horizontal leg 7 and a vertical leg 8. These legs are graduated as shown at 9 and these graduations determine the correct position of the dimming medium. For instance, if it is desired to properly adjust the dimming medium for a certain person, it is only necessary to loosen the screws 6 and then to grasp the celluloid and adjust it horizontally and vertically. When the proper position is obtained it is permanently secured by again tightening the screws.

The intervening space formed between the frames C, the dimming medium and the spectacles proper is left empty and the normal vision of the wearer is thus through the empty spaces indicated at 10. The normal view is therefore free and unobstructed and the vision is in no way impaired when driving an automobile at night. The view of the road and its sides in clearly illuminated by the lights of the machine which is being driven, and the road may also be illuminated by approaching machines.

The dimmers are not required except when blinding headlights are encountered and they are interposed between the blinding headlights and the eyes of the wearer by slightly turning and tilting the head in a forward direction. In other words, it might be stated that the wearer only views the glaring headlights through the corners of the eyes and as such is the case the dimming medium will consequently be interposed and all blinding effects are obviated. The side of the road between the machine and beyond the approaching machine still remains clear to the vision of the driver as that portion of the road is viewed through the unobstructed portions 10.

In countries where the law governing vehicular travel requires vehicles in passing each other on the highways to turn to the right, the dimming device is preferably located in the upper left hand quadrant of the spectacle frame or other supporting device, and the particular location of the dimming medium may therefore be varied under different conditions and regulations.

The spectacle frame may be constructed of metal or any suitable material, and similarly the clamping frames C. In Fig. 2 the clamping frame is eliminated, but the extended quadrants indicated at 11 are channeled on the inside to receive the dimming medium 12. It is here secured by cement or other means and as such is not adjustable; this construction necessitating the proper fitting at the place of purchase. It may further be stated that the spectacle frame and entire structure may be made of celluloid or like material throughout if this is desired.

In Fig. 3 the dimming medium is shown at 13. The frame supporting the same may be constructed of any material and it only differs from the structure shown in Fig. 2 to the extent that the unobstructed space 10 is provided for the reception of a pair of lenses. These are properly fitted to the wearer and it can thus be seen that the dimming medium may be attached to an ordinary pair of glasses where this is desired. In the specification I have referred to the dimming medium as constructed of celluloid or glass, colored to suit its particular use, but it is obvious that any other dimming medium may be employed.

While certain features of the present invention are more or less specifically illustrated, I wish it understood that various changes in form and proportion may be resorted to within the scope of the appended claims. I similarly wish it understood that the materials and finish of the several parts employed may be such as the experience and judgment of the manufacturer may dictate or various uses may demand.

Having thus described my invention, what I claim and desire to secure by Letters Patent is—

1. Eye glasses of the character described comprising a pair of rims, a nose bridge connecting the same, a semitransparent section of light dimming material supported by and within each rim and covering only an upper quadrant of the total interior area of each rim and said sections presenting horizontal and vertical side and bottom lines within the rims, and means permitting horizontal and vertical adjustment of each dimmer.

2. Eye glasses of the character described, comprising a pair of rims, means for disposing and supporting the same in front of the eyes of the wearer, a clamping member on each rim, and a substantially square-shaped section of colored light dimming material carried by each clamping member and covering substantially an upper quadrant thereof, said dimming material being disposed within the rims and being vertically and horizontally adjustable with relation to the clamping members.

3. Eye glasses of the character described comprising a pair of rims, means for disposing and supporting the same in front of the eyes of the wearer, a clamping member carried by each rim, a section of colored light dimming material carried by each clamping member, said clamping members being substantially L-shaped, one leg being horizontally disposed and one leg being vertically disposed, a graduated scale on each leg, and means permitting adjustment of the dimming medium with relation to each scale.

4. In eye glasses of the character described, a spectacle frame adapted to be disposed in front of the eyes of the wearer, and an adjustable dimming medium carried within and held partly housed by the spectacle frame, and essentially only within an upper quadrant thereof, and adapted to be interposed between the eyes of the wearer and a source of light, said interposition of the dimming medium being accomplished by a tilting movement of the head.

5. In eye glasses of the character described, a spectacle frame adapted to be disposed in front of the eyes of the wearer and normally affording a clear and unobstructed vision, a pair of dimming members carried within and partially housed by the spectacle frame, said dimming members presenting horizontal bottom edges and vertical side edges within the spectacle frame and in the line of vision, and each dimming member covering only an upper quadrant portion, and means permitting vertical and horizontal adjustment of said dimming medium with relation to the spectacle frame.

6. In eye glasses of the character described, a pair of rims, a nose bridge connecting the same and a dimming medium within each rim and covering only a quadrant thereof and positioned essentially in the upper left segmental quadrant of the rims, and each dimming member presenting a vertical side edge and a horizontal bottom edge to the line of vision when looking through the rims.

7. In eye glasses of the character described, a pair of rims, a nose bridge connecting the same, a semitransparent section of light-dimming material supported by and within each rim, and covering only an upper quadrant of the total area of each rim, and means permitting horizontal and vertical adjustment of each dimming member with relation to the rims.

JARROT L. ROLLINS.